M. SPERLING.
ELECTRODE PACKING FOR MELTING FURNACES.
APPLICATION FILED NOV. 13, 1914.
1,234,946. Patented July 31, 1917.
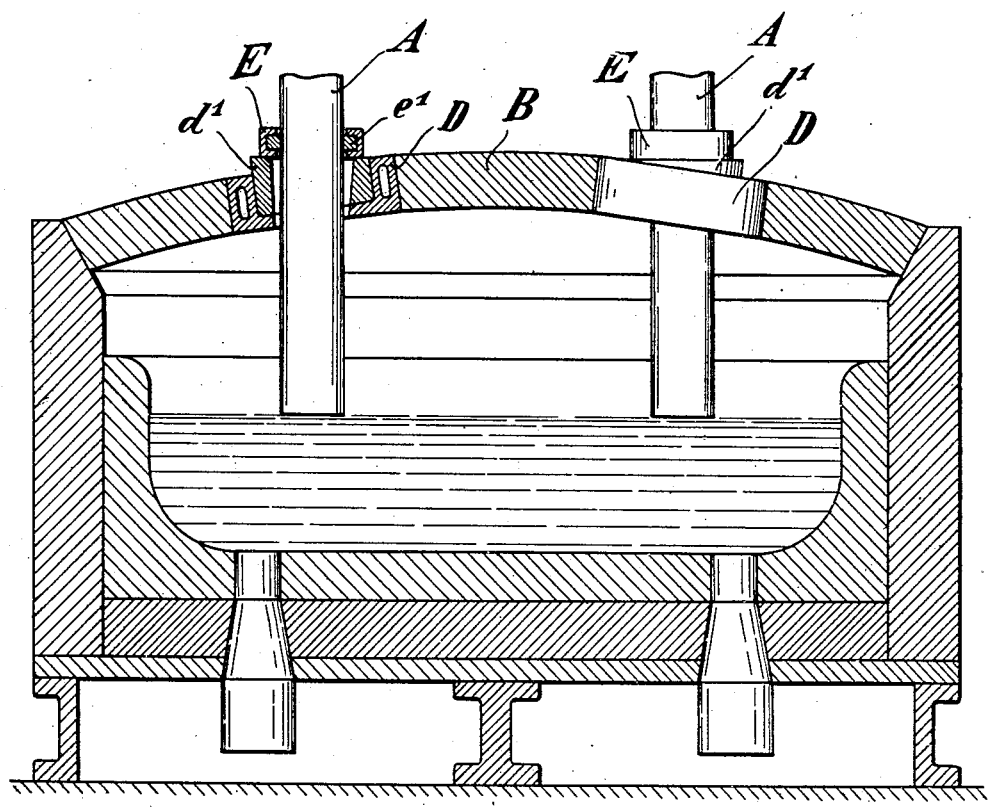

UNITED STATES PATENT OFFICE.

MARTIN SPERLING, OF ESSEN-ON-THE-RUHR, GERMANY, ASSIGNOR TO FRIED. KRUPP AKTIENGESELLSCHAFT, OF ESSEN-ON-THE-RUHR, GERMANY.

ELECTRODE-PACKING FOR MELTING-FURNACES.

1,234,946.  Specification of Letters Patent.  Patented July 31, 1917.

Application filed November 13, 1914. Serial No. 871,968.

*To all whom it may concern:*

Be it known that I, Dr. MARTIN SPERLING, residing at Essen/Ruhr, Germany, a citizen of the German Empire, have invented a certain new and useful Improvement in Electrode-Packings for Melting-Furnaces, of which the following is a specification.

The present invention relates to electrode packings for melting furnaces, which have the electrodes mounted in an annular member in the furnace cover. The object of the present invention is now to provide an electrode packing, which is applicable not only to electrodes that are freely suspended, but also to electrodes which are firmly fixed in the usual manner on an electrode carrier. The invention resides in the use of an interchangeable packing ring, closely fitting around the electrode, and resting on top of the annular member, which incloses the electrode leaving considerable play, the annular member and the packing ring being easily displaceable relative to each other transversely to the electrode.

One embodiment of the invention is illustrated in the accompanying drawing showing a melting furnace in vertical section with electrode packings.

Water cooled iron annular members D of known construction are inserted in the cover B where the electrodes A run through. Each annular member is provided with a liner $d^1$ made from insulating material. The inside diameter of the liner $d^1$ at its narrowest place leaves ample play for the electrode A. This play is necessary to compensate for inexactness in securing the electrode, and to prevent injury thereof on travel of the annular member, caused by the action of the heat. At its upper surface, the liner $d^1$ is flattened to form a seat for an iron ring E, which is also provided with an insulating bushing $e^1$. The bushing $e^1$ incloses the electrode A with very slight play, so that a tight closure of the opening in the annular member is assured.

The packing ring E is held stationary by the electrode during the travel of the annular member D. All injury to the electrode is thus avoided, as, on account of the described seating of the packing ring E, the annular member and the packing ring are easily movable relative to each other transversely to the electrode. As during the travel of the annular member, the space between it and the electrode will remain covered, the packing action is secured even when the annular member travels. When the diameter of the electrode through long use has been diminished so much, that a larger play has arisen between it and the liner $e^1$ of the packing ring E, the packing ring will be replaced by one of narrower bushing. As the packing ring is easily replaced, a lasting effective packing has consequently been produced.

I claim:

1. An electrode-packing for melting furnaces comprising a fluid cooled annular member rigidly secured in the roof of the furnace, said member having an inwardly projecting flange and a liner of insulating material seated thereon, said flange and liner having each a central opening of greater diameter than that of the electrode; a tight-fitting packing ring around the electrode, said packing ring being suspended from the top of said liner so as to permit movement of the electrode in said openings in a direction transversely to its axis.

2. An electrode-packing for melting furnaces comprising an annular member secured in the roof of the furnace and inclosing the electrode with considerable play, a tight-fitting packing ring around the electrode, said packing ring being situated loosely on top of said annular member and slidably relatively thereto in transverse direction to the electrode; said packing ring having an outer metallic casing and a core of insulating material.

The foregoing specification signed at Barmen, Germany, this 2nd day of October, 1914.

MARTIN SPERLING. [L. S.]

In presence of—
 HELEN NUFER,
 ALBERT NUFER.